US008204014B2

(12) United States Patent
Mondal et al.

(10) Patent No.: US 8,204,014 B2
(45) Date of Patent: Jun. 19, 2012

(54) METHOD AND SYSTEM FOR CODEBOOK-BASED CLOSED-LOOP MIMO USING COMMON PILOTS AND ANALOG FEEDBACK

(75) Inventors: Bishwarup Mondal, Oak Park, IL (US); Kevin L. Baum, Rolling Meadows, IL (US); Amitabha Ghosh, Buffalo Grove, IL (US); Timothy Thomas, Palatine, IL (US); Frederick Vook, Schaumburg, IL (US); Fan Wang, Chicago, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 598 days.

(21) Appl. No.: 12/405,307

(22) Filed: Mar. 17, 2009

(65) Prior Publication Data

US 2009/0238303 A1   Sep. 24, 2009

Related U.S. Application Data

(60) Provisional application No. 61/037,481, filed on Mar. 18, 2008.

(51) Int. Cl.
*H04W 4/00* (2009.01)
*H04L 1/00* (2006.01)
*H04L 12/26* (2006.01)
(52) U.S. Cl. ........................ 370/329; 370/252
(58) Field of Classification Search ........... 370/252, 370/328, 329
See application file for complete search history.

(56) References Cited

U.S. PATENT DOCUMENTS

| | | | | |
|---|---|---|---|---|
| 2006/0093065 | A1* | 5/2006 | Thomas et al. | 375/299 |
| 2006/0111148 | A1* | 5/2006 | Mukkavilli et al. | 455/562.1 |
| 2006/0276212 | A1* | 12/2006 | Sampath et al. | 455/513 |
| 2009/0080560 | A1* | 3/2009 | Na et al. | 375/267 |
| 2009/0086648 | A1* | 4/2009 | Xu et al. | 370/252 |

OTHER PUBLICATIONS

Wonil Roh et al., "IEEE C802.16e-041552r3: Framework for enabling closed-loop MIMO for OFDMA", Nov. 14, 2004, contribution to IEEE802.16e, all pages.
J. Ylitalo, "Channel estimation study of CDMA downlink for fixed beam BTS", Proc. of the IEEE International Symposium on Personal, Indoor and Mobile Radio Communications, PIMRC, 2002, pp. 242-246.
A. Bastug, G. Montalbano, D. Slock, "Generalized pilot assisted channel estimation for WCDMA", EUSIPCO 2005, 13th European Signal Processing Conference, Sep. 4-8, 2005, Antalya, Turkey.

* cited by examiner

*Primary Examiner* — Ronald Abelson (57) ABSTRACT

A method and system that enables the usage of sounding-based feedback or analog feedback in a MIMO communication system with non-beamformed or broadcast pilot symbols is disclosed. The mobile station may employ a feedback channel to send a sounding waveform to a base station, a feedforward channel to receive from the base station codebook weights derived from the send sounding waveform, a receiver to receive communication from the base station, and a processor to detect beamformed data from the received communication and received codebook weights from the base station. The base station processes the sounding waveform to determine codebook weights on groups of subcarriers. Additionally, the base station transmits the beamformed payload and broadcast pilots to the mobile station.

17 Claims, 7 Drawing Sheets

METHOD AND SYSTEM FOR CODEBOOK-BASED CLOSED-LOOP MIMO USING COMMON PILOTS AND ANALOG FEEDBACK

BACKGROUND OF THE DISCLOSURE

1. Field of the Disclosure

The disclosure relates generally to broadband wireless access communication systems, and more particularly to base station quantization in a broadband wireless access communication system.

2. Introduction

In WiMAX (IEEE 802.16), two principle communication wireless network nodes are defined including a Base Station (BS) and a Mobile Station (MS). WiMAX offers an open standard and support to quality of service (QoS) for different categories of services. The communication between the BS and MS is through an uplink channel and a downlink channel. In order to maintain this quality of service, multiple transmit and receive antenna arrays, commonly called MIMO systems, may employ beamforming techniques to compensate for channel conditions and for increasing signal-to-noise (SNR) levels at the MS. In one form of closed-loop MIMO systems, indices from a codebook of beamforming vectors or matrices known by both the BS and MS are determined at the MS and recommended to be used by the BS in the beamforming technique. This technique is known as codebook-based feedback (CBF) because the MS indicates the optimum precoding matrix (from the predefined codebook) to the BS via a feedback channel (e.g., the uplink channel). The codebook size increases significantly with the number of transmit antennas at the BS and may even increase with the number of transmitted data streams.

CBF is computationally expensive for MSs and the computational cost increases with the increase of the number of transmit antennas at the BS and the codebook size. Direct covariance feedback (DCOVF) and uplink channel sounding (ULCS) have been proposed as alternatives to CBF and offer lower complexity at the MS. Both DCOVF and ULCS, however, require dedicated pilots in the beamformed transmission from the BS. Dedicated pilots are pilots typically intended for only one user and are reference signals that are beamformed with the same transmit beamforming weights used on the data for that user. Thus, the dedicated pilots can only be used for the one user and are unavailable to other users for channel estimation purposes. Dedicated pilots, however, will limit the channel estimation performance at the MS because the MSs can only use the small subset of the total number of pilot symbols that are beamformed for that MS (this is opposed to broadcast pilots where all pilots can be used for channel estimation). In addition, dedicated pilots may be restricted in usage due to other constraints imposed by the control channel, or other pilot signals such as the midamble, etc.

For the reasons stated above, and for other reasons stated below which will become apparent to those skilled in the art upon reading and understanding the present specification, there is a need in the art for a mechanism that lowers the computational complexity at the MS in closed-loop MIMO while not limiting the channel estimation performance at the MS.

SUMMARY OF THE DISCLOSURE

A method and system that enables the usage of sounding-based feedback or analog feedback (including ULCS and DCOVF) in a MIMO communication system with non-beamformed or broadcast pilot symbols is disclosed. The MS may employ an uplink channel to send a sounding waveform to a BS; a feedback channel to send DCOVF or other feedback, or even normal uplink traffic; a feedforward channel to receive from the BS codebook weights derived from the sounding waveform (or from any other feedback that is being used including normal uplink traffic, DCOVF, etc.); a receiver to receive communication from the BS; and a processor to detect beamformed data from the received communication and received codebook weights from the BS. The BS processes the sounding waveform, the DCOVF, or regular uplink traffic from the MS to determine codebook weights on groups of subcarriers. Additionally, the BS transmits the beamformed payload and broadcast pilots to the MS.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure.

The invention concerns the exchange of packets in a broadband wireless metropolitan area networks (WMANs) using, for example, the IEEE 802.16 standard commonly known as WiMax, although the invention is not limited thereto and can be applied to other types of wireless networks where similar advantages may be obtained. The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, fixed user stations, MSs, BSs, access points (APs), hybrid coordinators (HCs), gateways, bridges, hubs, routers and other network peripherals. Further, the radio systems within the scope of the invention may include cellular radio telephone systems, satellite systems, personal communication systems (PCS), two-way radio systems and two-way pagers as well as computing devices including such radio systems such as personal computers (PCs) and related peripherals, personal digital assistants (PDAs), personal computing accessories, hand-held communication devices and all existing and future systems which may be related in nature and to which the principles of the inventive embodiments could be suitably applied. The subscriber station of a wireless communication system can traffic data within different regions of the network.

Figure 1:
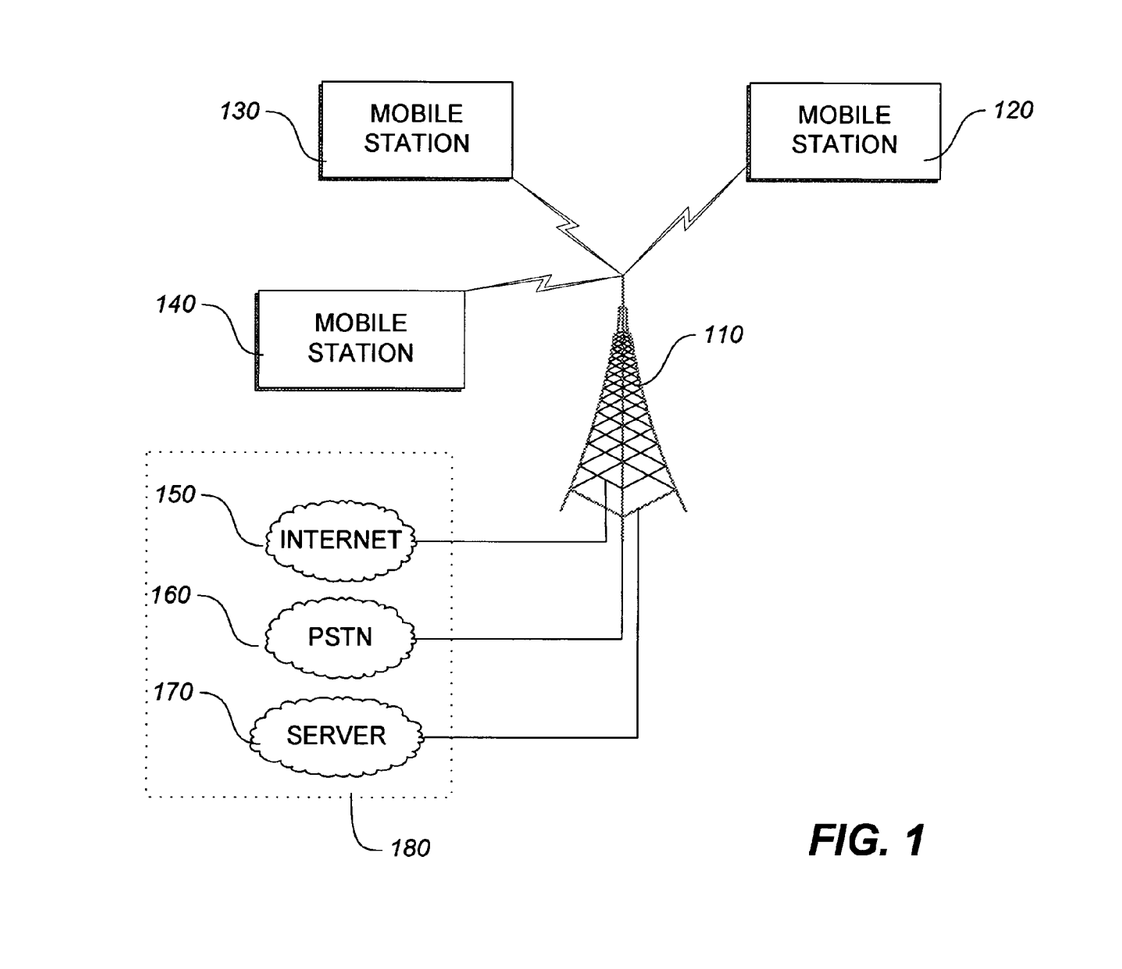
FIG. 1 is an exemplary diagram of a wireless network in accordance with a possible embodiment of the invention.

FIG. 1 is an illustration of a wireless communication network 100. According to various inventive embodiments, wireless communication network 100 may be any wireless system capable of facilitating wireless access between a provider network 180 such as internet network 150, public switch telephone network 160, and server 170 and one or more mobile stations 120, 130, 140 including mobile subscribers. For example, in one embodiment, network 100 may be a wireless broadband network such as those contemplated by various 802.16 standards specified by the Institute of Electrical and Electronics Engineers (IEEE) for fixed and/or mobile subscribers, although the inventive embodiments are not limited in this respect.

In broadband wireless networks that operate in accordance with the IEEE 802.16 standards (referred to as WiMAX, an acronym that stands for Worldwide Interoperability for Microwave Access, which is a certification mark for products that pass conformity and interoperability tests for IEEE 802.16 standards), two principle communicating wireless network nodes are defined including the BS 110 and the MS (e.g., subscriber stations 120, 130, 140). Extended Real-Time Polling Service (ertPS) is one of the five QOS service types defined in the IEEE 802.16e (WiMax) standard. The 802.16 protocol supports five types of QoS such as UGS (Unsolicited grant service), rtPS (Real time polling Service), ertPS (Extended Real-time POLLING SERVICE), nrtPS (Non-real-time polling service and BE (Best effort service). ertPS is a scheduling mechanism that builds on the efficiency of both UGS and rtPS. The ertPS is designed for real-time traffic with variable data rate (such as VoIP service with silence suppression) over the WiMax network.

The present invention may be implemented in wireless communication systems employing the following air interfaces: orthogonal frequency division multiplexing (OFDM); orthogonal frequency division multiple access (OFDMA); single carrier-frequency division multiple access (SC-FDMA); code division multiple access (CDMA) including wideband CDMA (WCDMA); time division duplex (TDD) systems, including HCR, LCR, and TDS-CDMA; frequency division duplex (FDD) systems; IEEE 802.16e; and IEEE 802.11n air interfaces.

BS 110 is a managing entity which controls the wireless communication between MSs 120-140 and provider network 180. MSs 120-140 in turn, may facilitate various service connections of other devices (not shown) to provider network 180 via a private or public local area network (LAN), although the embodiments are not limited in this respect.

In one implementation, BS 110 sends data to MSs 120-140 in the downlink (DL) and receives data from subscriber stations 120-140 in the uplink (UL) in the form of radio frames. In one example embodiment, uplink and downlink communications are maintained by sending radio frames at constant, but configurable intervals. One notable feature of these types of networks is that a single radio frame may consist of data destined to, or originating from, multiple MSs. As an example, MS 120 may service multiple connections for other devices of a local area network all within individual UL and DL radio frames. As another example, MS 120-140 may communicate with the BS 110 using the same DL and/or the same UL radio frame.

Figure 2:
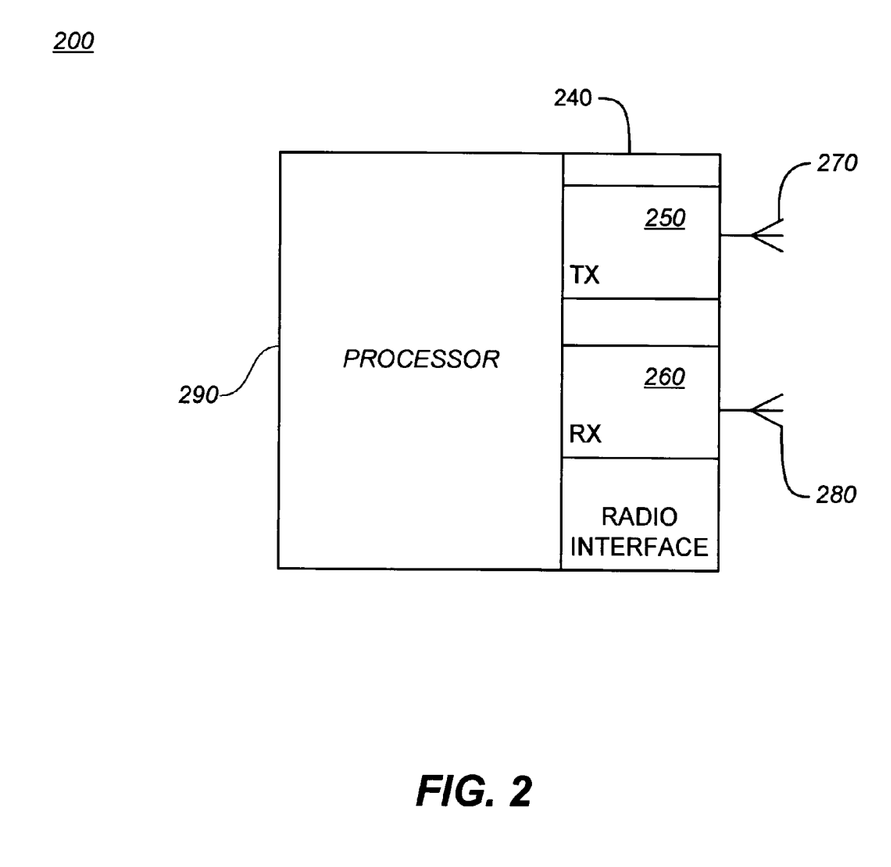
FIG. 2 is a diagram of a component for a BS or a MS in accordance with a possible embodiment of the invention.

FIG. 2 is an illustration of components of a BS or a MS 200 or subscriber station for use in a wireless network. The BS or MS 200 comprises a processing circuit including circuitry, processor 290 and software, or a combination thereof. In certain embodiments, a BS or a MS 200 may generally include a radio frequency (RF) interface 240. In one example embodiment, RF interface 240 may be any component or combination of components adapted to send and receive multi-carrier modulated signals such as OFDM, although the inventive embodiments are not limited to any specific over-the-air interface or modulation scheme. RF interface 240 may include, for example, a single or multiple antenna capable receiver 260, and a single or multiple antenna capable transmitter 250. RF interface 240 may also include bias controls for calibration, codebooks, a crystal oscillator and/or one or more antennas 270, 280 if desired. Furthermore, RF interface 240 may alternatively or additionally use external voltage-controlled oscillators (VCOs), surface acoustic wave filters, intermediate frequency (IF) filters and/or radio frequency (RF) filters as desired. Various RF interface designs and their operation are known in the art and the description thereof is therefore omitted. In some embodiments, RF interface 240 may be configured to be compatible with one or more of the IEEE 802.16 standards contemplated for broadband wireless networks, although the embodiments are not limited in this respect.

The BS or a MS 200 could include MAC processor (not shown) that communicates with RF interface 240 to process receive/transmit signals and may include an analog-to-digital converter for down converting received signals, a digital-to-analog converter for up converting signals for transmission, and optionally, a baseband processor for physical (PHY) link layer processing of respective receive/transmit signals. A MAC processor could perform medium access control and data link layer processing. Further, a MAC processor would include an uplink scheduler, in combination with additional circuitry such as buffer memory scheduling buffer. The MAC processor and scheduling buffer may function to queue, dequeue or otherwise schedule MAC Source Data Units (SDUs) for uplink transmission to BS 110.

Processor 290 may include at least one conventional processor or microprocessor that interprets and executes instructions from a memory. A Memory may be a random access memory (RAM) or another type of dynamic storage device that stores information and instructions for execution by processor 290 based on the desired functionality. Alternatively, processor 290 may include an article of manufacture comprising a tangible medium having machine readable instructions stored thereon, the machine readable instructions when executed by a processing platform (processor 290) results in transmitting packets to a BS at an agreed upon bandwidth request or adjusting based on the determined packet latency the agreed upon bandwidth request. In varying embodiments, a memory is a magnetic medium, an electronic medium, or an optical medium. A memory may also include a read-only memory (ROM) which may include a conventional ROM device or another type of static storage device that stores static information and instructions for processor 290. The executable instructions are capable of directing processor 290 to perform selecting and/or requesting at least one of a bandwidth higher than the agreed upon bandwidth request, a bandwidth lower than the agreed upon bandwidth request or the agreed upon bandwidth request. The request is based on packets at the subscriber station or MS that need transmission to the BS or based on packets at the subscriber station at the time of the bandwidth request and a prediction of the packets that will arrive before the bandwidth request is granted by the BS.

The BS or MS 200 may be, for example, a wireless MS, wireless router or NIC and/or network adaptor for computing devices. Accordingly, the previously described functions and/or specific configurations of BS or a MS 200 could be included or omitted as suitably desired. Embodiments of BS or MS 200 may be implemented using single input single output (SISO) architectures. However, as shown in FIG. 2, certain preferred implementations may use multiple input multiple output (MIMO) architectures having multiple antennas (e.g., 270, 280) for transmission and/or reception. Further, embodiments of the invention may utilize multi-carrier code division multiplexing (MC-CDMA) multi-carrier direct sequence code division multiplexing (MC-DS-CDMA) for over-the-air (OTA) link access or any other existing such as those disclosed above with reference to FIG. 1 or future arising modulation or multiplexing scheme compatible with the features of the inventive embodiments.

The components and features of a BS or a MS 200 may be implemented using any combination of discrete circuitry, application specific integrated circuits (ASICs), logic gates and/or single chip architectures. Further, the features of the MS 120 or BS 110 may be implemented using microcontrollers, programmable logic arrays and/or microprocessors or any combination of the foregoing where suitably appropriate (collectively or individually referred to as "logic" or "circuit"). It should be appreciated that the example BS or MS 200 shown in the block diagram of FIG. 2 represents only one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments of the present invention. Unless contrary to physical possibility, the inventors envision the methods described herein: (i) may be performed in any sequence and/or in any combination; and (ii) the components of respective embodiments may be combined in any manner.

Figure 4:
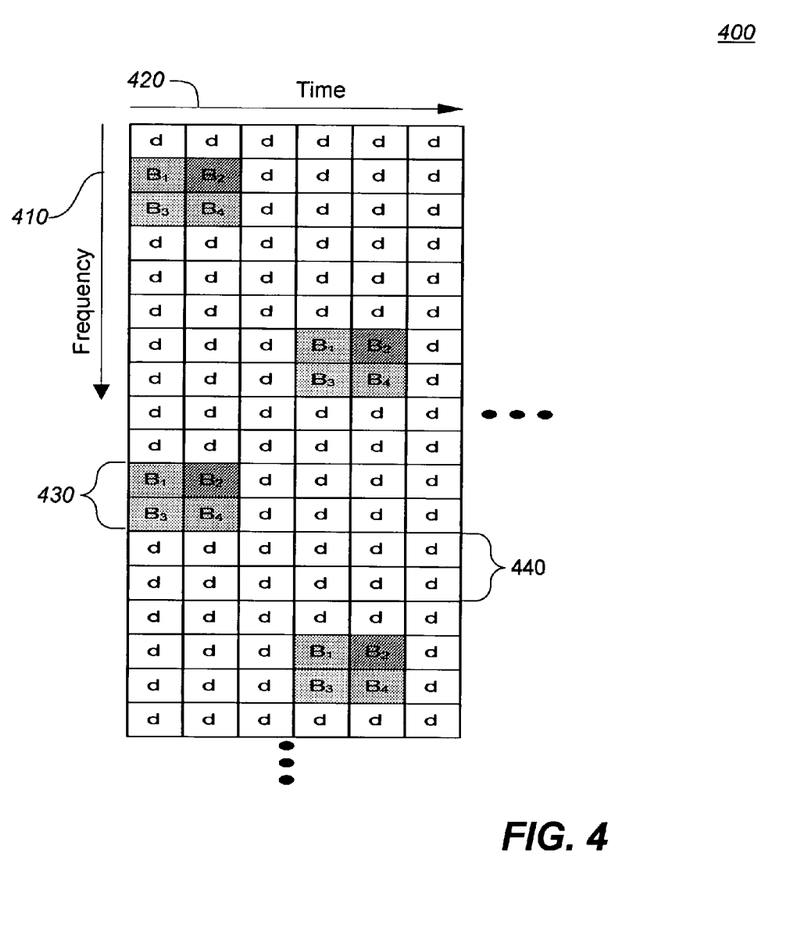
FIG. 4 is a diagram showing an example of broadcast pilots in an OFDM communication system.

Before describing the invention further, it is first worthwhile describing what is meant by broadcast pilots. FIG. 4 shows an example of a broadcast pilot format 400 that may be employed in the downlink of an OFDM system. In this figure, each square represents a time 420 frequency 410 resource (aka subcarrier) that may be assigned data (d) such as block 440 or broadcast pilot symbols for the different transmit antennas, $B_n$ ($B_n$ refers to the pilot symbol for transmit antenna n) such as block 430. In this example, the broadcast pilot pattern continues in time for at least the duration of the downlink frame (and possibly further forward or back in time) and also continues in frequency for the entire bandwidth of the OFDM system. Because a pilot sequence (which is a group of pilot symbols) is sent from each of the transmit antennas, these pilot symbols are available to all MSs that have data assigned on any subset of the data carrying subcarriers in the frame or in fact any mobile in the system. The availability of pilot symbols that span the entire bandwidth and the entire frame in time provide an improvement in channel estimation to pilot symbols that are available only on a small portion of the downlink (e.g., dedicated pilots that are only for the mobile assigned data on a small subset of the downlink frame).

Figure 3:
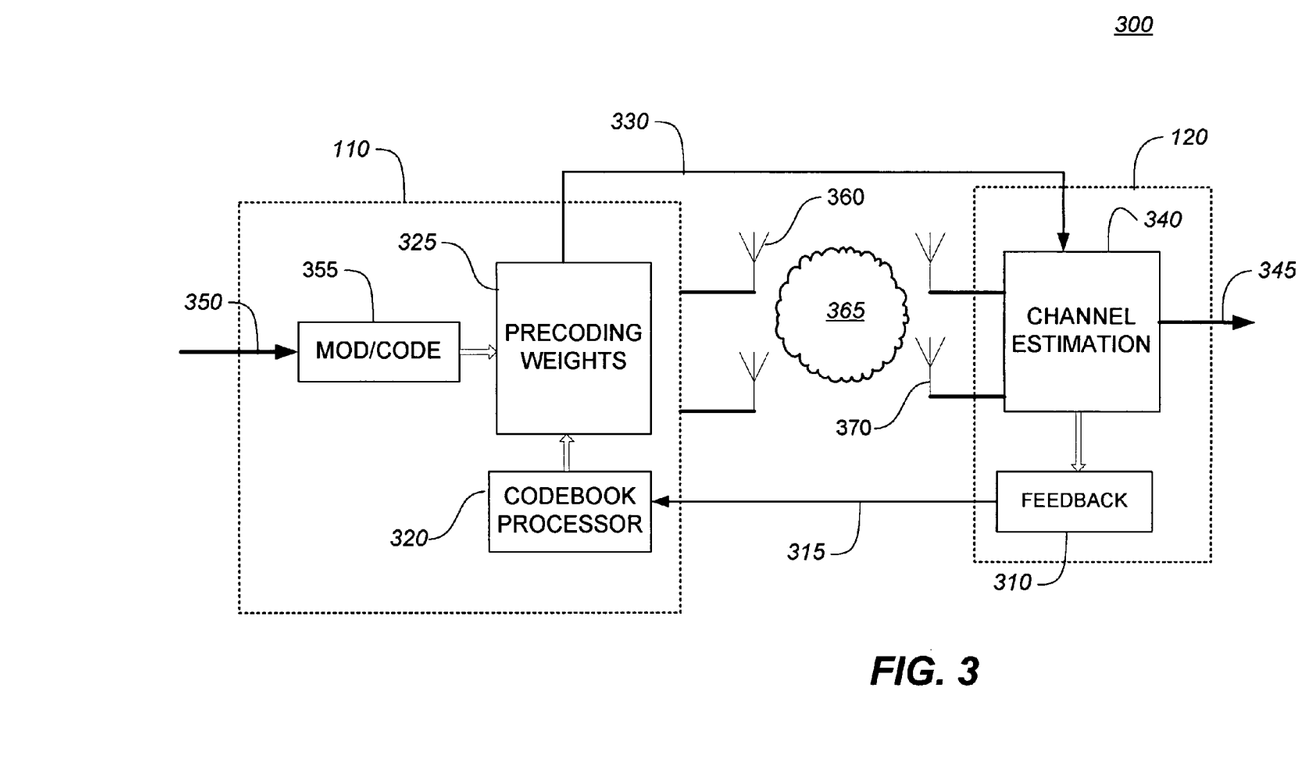
FIG. 3 is an exemplary diagram of a BS and a MS with feedback and feedforward signals in accordance with a possible embodiment of the invention.

FIG. 3 is an exemplary diagram of an arrangement 300 for BS quantization in accordance with a possible embodiment of the invention. The arrangement 300 illustrates the exchanging of messages between a BS 110 and a MS such as station 120-140 in wireless communication system 100. The communication system may include a multi-antenna transmitter 360 and a multi-antenna receiver 370 that communicate via an OFDM MIMO air interface 365, although the embodiments are not limited in this respect. The BS 110 and the MS 120 may include elements similar to existing communication devices such as coding/modulation or detection/demodulation logic, Fast Fourier Transform (FFT)/Inverse FFT logic, and/or other components as suitably desired.

The BS 110 through transmit antennas 360 sends a message to MS 120 requesting the mobile to sound. The MS 120 through a feedback apparatus 310 responds to the BS 110 with a sounding waveform. A feedback channel 315 transports the sounding waveform to BS 110. The sounding waveform comprises pilot symbols that are potentially known a-priori to the BS (as in uplink channel sounding or ULCS). In addition to the pilot symbols, the sounding waveform may contain analog data derived from the estimates of the channel. The analog data may include raw coefficients of the channel (as in direct coefficient feedback or DCF), entries of a spatial covariance matrix (as in direct covariance feedback or DCOVF), coefficients of the singular vectors of the spatial covariance matrix etc. The sounding waveform is transmitted from the MS 120 to the BS 110 over the feedback channel 315 using one or more transmit antennas at the MS 120 and one or more receive antennas at the BS 110. The received sounding waveform from one or more MSs is processed in codebook processor 320 and a set of precoding weights 325 is chosen from a codebook by the BS 110.

Codebook processor 320 is used to determine codebook weights on one or more groups of subcarriers. Codebook processor 320 may perform one or more of the following procedures on the received sounding waveform: quantization using a codebook, estimation of the uplink channel, conversion of the uplink channel estimates to downlink channel estimates, filtering in time and/or frequency of the sounding waveform or a transformation thereof. The codebook can be designed using several techniques known in the art, including techniques in D. J. Love, R. W. Heath, Jr., and T. Strohmer, "*Grassmannian Beamforming for Multiple-Input Multiple-Output Wireless Systems,*" *IEEE Transactions on Information Theory* October 2003. The conversion of the uplink channel estimates to downlink channel estimates is a step that may be required in Time Division Duplex (TDD) systems in which the BS estimates an uplink channel response from UL sounding waveform transmitted by the MS. In a TDD system, the UL and DL multipath channel responses are assumed to be equivalent (an assumption of UL and DL reciprocity, which holds when the UL and DL are on the same frequency band (TDD)). Converting the estimated uplink channel response to an estimated downlink channel response may involve computing reciprocity calibration coefficients that are used to compensate for the non-reciprocal effects of the RF transceiver hardware at the BS.

Codebook processor 320 can be programmed to compute parameters from the uplink waveform such as direction of arrival, an array response vector, a set of eigenbeamforming weights, and a set of array calibration coefficients.

In operation, input stream 350 is modulated and coded by mod/code 355 and weighted by precoding weights 325 before being fed to the multiple transmit antennas 360. Multiplying an input stream 350 by precoding weights 325, where the transmit weights are based on at least a partial channel response, is one example of tailoring a spatial characteristic of the transmission. Methods for determining the transmit weights from the channel response are known in the art. The signals transmitted from the multiple transmit antennas 360 propagate through a MIMO air interface 365 and are received by multiple receive antennas 370. The signals may include broadcast pilots, payload transmission that has preferably been beamformed, and control data. The signals received on the multiple receive antennas 370 are processed by receive channel estimation 340 using the codebook index received via a feedforward channel 330 to produce the output symbol stream 345. The feedforward channel 330 may be transmitted over the air using one or more transmit antennas 360 and received using one or more receive antennas 370.

The above description assumed that the MS 120 was requested to send either a sounding waveform or specific feedback such as DCOVF. An alternative operation requires no feedback request from the BS 110 but instead the BS 110 utilizes normal uplink traffic from the MS 120 to determine the codebook index (i.e., precoding weights) to use for transmission. In this alternative operation, the BS operating in a TDD system may estimate an UL channel response from the normal uplink traffic and convert that estimated UL channel response to a downlink channel response estimate (for example by leveraging reciprocity calibration coefficients as discussed earlier), and the codebook index is then computed based upon the estimated channel response. Furthermore in this alternative operation, the BS may compute the codebook index based on combinations of the signals received on the UL and the reciprocity calibration coefficients. In another variation of this alternative operation, the BS operating in either an FDD or TDD system may compute one or more direction of arrival (DOA) estimates for the multipath of the MS UL channel response. In this case, the codebook index is computed based on one or more DOA estimates and potentially one or more reciprocity calibration coefficients. As in the feedback case, the codebook index is sent from the BS 110 via a feedforward channel 330 to the MS 120.

In another embodiment of the invention, the base station computes one or more DOA estimates of the MS UL channel response and instead of finding a codebook index based on the DOA estimates and feeding forward the codebook index, the base feeds forward the DOA estimate itself. The mobile then can use the DOA estimates, channel estimates obtained from the broadcast pilots, and knowledge of how the base computes transmit weights from the DOA estimates to determine the composite downlink channel.

It should be noted that the feedforward channel 330 may take various forms and the invention is not limited to one form. One example of a feedforward channel 330 is simply a bit stream that indicates a codebook index. Another example of a feedforward channel 330 would be analog feed forwarding of the codebook weights. Yet another example of a feedforward channel 330 could be the feed forwarding of other parameters (such as DOAs) that can be used by the mobile to determine its codebook weights.

Figure 5:
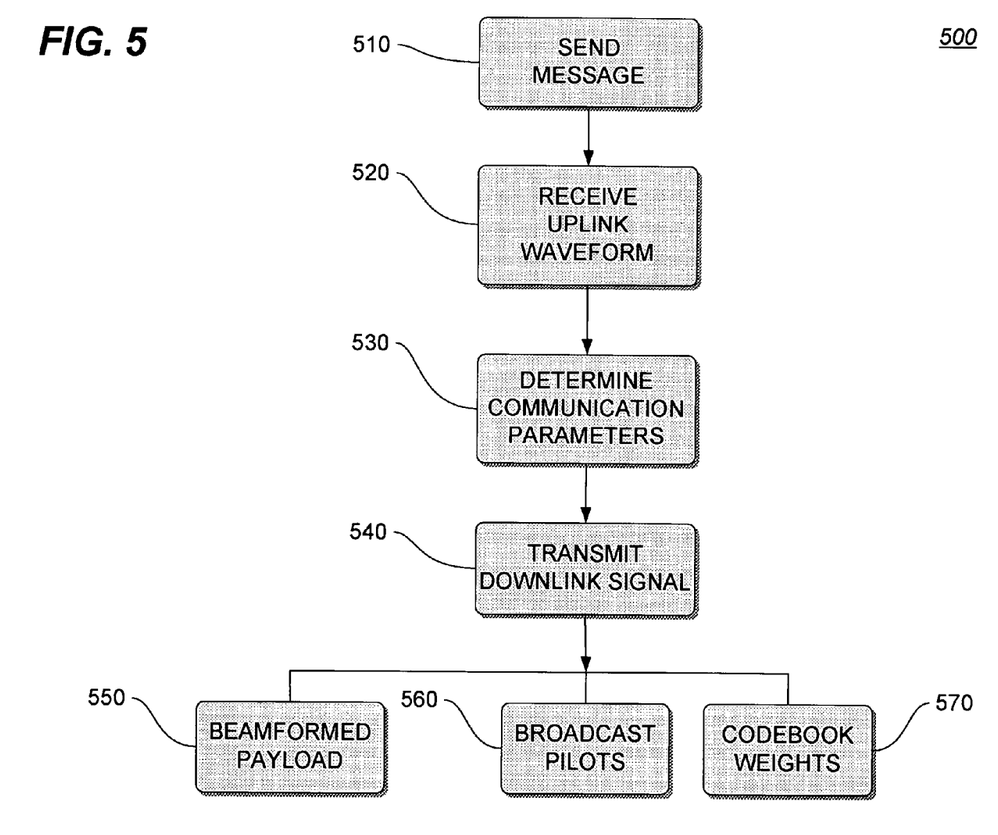
FIG. 5 is a flowchart showing processing of a received uplink waveform at the BS in accordance with a possible embodiment of the invention.

FIG. 5 is an illustration of process 500 performed at the BS 110 in accordance with a possible embodiment of the invention. The process begins with a send message 510 from the BS 110 requesting that the MS 120 sound or provide other feedback such as direct covariance feedback (DCOVF). The BS 110 sends a message 510 to MS 120 to sound. There are well known ways for the BS 110 and the MS 120 to cooperate in the exchange of information through sounding. For example, the BS simply generates and transmits a message assigning an MS a time-frequency resource and a sounding waveform or through variations of the uplink channel sounding methodology. The Uplink channel sounding (ULCS) methodology of IEEE 802.16e may be modified to include instructions for the optional direct transmission of DL channel coefficients for a plurality of subcarriers or direct transmission of covariance matrix entries or direct transmission of singular vector entries as part of the sounding waveform. The modification consists of an additional field in the UL_Sounding_Command_IE( ), which is a message that the BS may configure and transmit to a BS for the purpose of indicating or instructing whether or not the channel coefficients are to be transmitted along with the sounding waveform in the sounding zone. The UL_Sounding_Command_IE( ) message is defined in Section 8.4.6.2.7 of IEEE 802.16e. When this functionality for the direct transmission of channel coefficients is used, the sounding waveform specified by the Sounding Command enables the BS to estimate the uplink (UL) channel, which the BS then uses to estimate the downlink (DL) channel coefficients being sent by the BS in the feedback portion of the sounding waveform. These estimated DL channel coefficients can then be used by the BS to perform closed-loop transmission. After the send message 510 is sent by the BS, control passes to step 520 for further processing.

In step 520, the BS receives a reply from the MS in the form of an uplink waveform or a sounding waveform. In step 530, the base station determines communication parameters based on the uplink waveform or the sounding waveform. The BS 110 uses the sounding waveform to estimate an uplink channel. The uplink channel is then converted to a downlink channel for estimating the codebook weights or other communication parameters such as DOAs.

As previously mentioned, in an alternative mode of operation, the BS 110 does not transmit a send message to the MS 120 requesting a sounding waveform. Instead, the BS 110 may use the normal uplink traffic to determine the communication parameters including the codebook weights, codebook weighting index, or other parameters such as DOAs. In either mode of operation, the BS 110 signals the codebook weights 570 or other communication parameters to the MS 120 using a feedforward mechanism.

In addition to codebook weights 570, BS 120 sends broadcast pilots 560 and beamformed payload transmission 550 using the downlink channel to the MS.

The beamformed payload transmission 550 may take various forms such as single stream beamforming where the codebook weight is a vector, multiple stream beamforming where the codebook weight is a codebook matrix where each column of the matrix corresponds to a different data stream, or multiple stream beamforming where two or more codebook weight vectors are used to create two or more beamformed data streams. Other forms of the beamformed payload transmission 550 are also possible such as using two (or more) codebook weight vectors (or two or more columns from a codebook matrix) to create two or more spatial streams that are coded (along with the data payload) using space-time or space-frequency block coding as is known in the art.

The MS receives the codebook weights, the broadcast pilots, and the beamformed payload transmission. As noted earlier with respect to FIG. 3, the MS has a feedback channel and a feedforward channel with potentially different modulation methods and/or bandwidths. It should be noted that feedforward and feedback channel need not be discrete channels but could be the downlink and the uplink of a communication system that uses the same modulation method (e.g., OFDM) with the same bandwidth.

Figure 6:
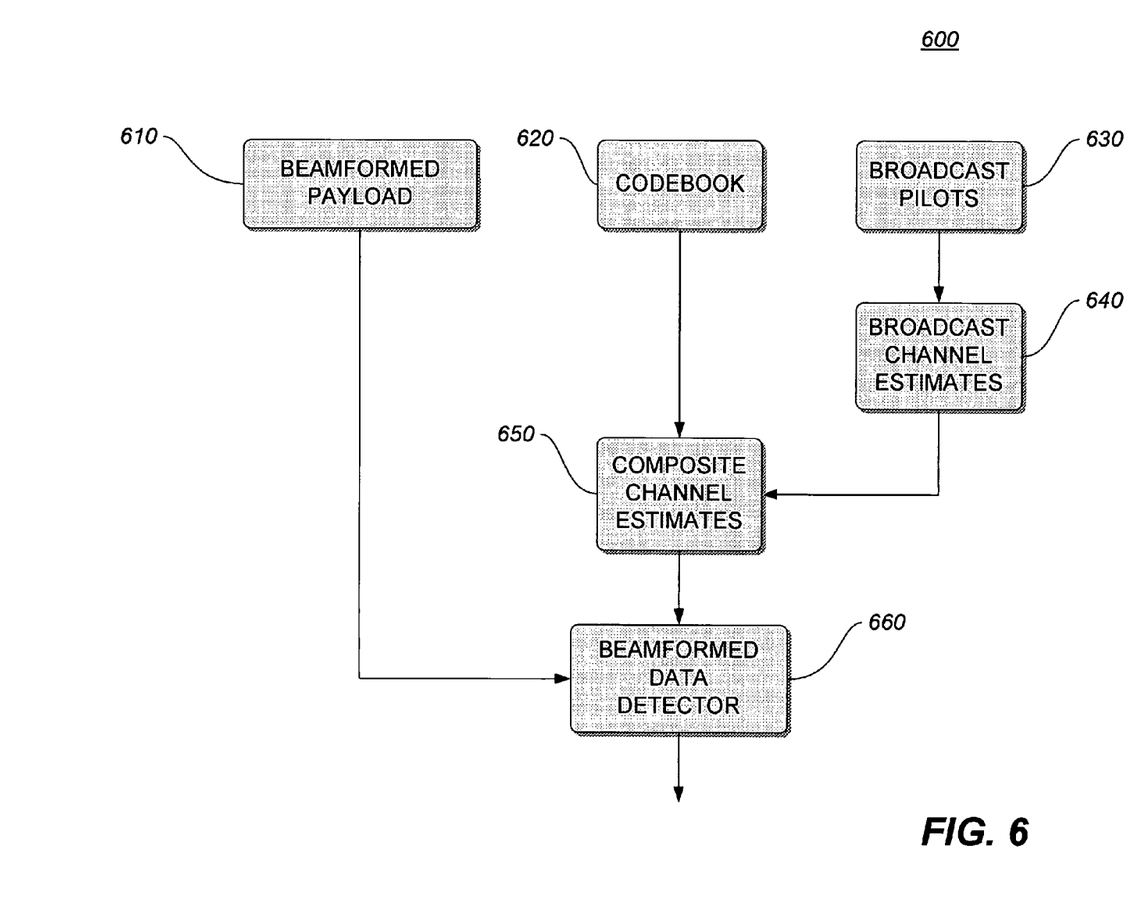
FIG. 6 is a flowchart showing processing at the MS of a received codebook index in accordance with a possible embodiment of the invention.

FIG. 6 is a flowchart of process 600 for MS processing of codebook index and broadcast pilots received from a BS in accordance with a possible embodiment of the invention. Process 600 begins with the MS 120 receiving inputs from the BS 110 such as beamformed payload transmission 610, codebook weights 620 or codebook index (or other communication parameters such as DOAs as described above), and broadcast pilots 630. It should be noted that these inputs need not arrive in any particular order, time frame, or channels. In step 640, the MS can run a multi-source channel estimator on the received pilot signals 630 to determine broadcast channel estimates. The broadcast channel estimates 640 and the codebook weights (index) 620 or other communication parameters are then used to determine composite channel estimates 650. For example, the composite channel estimates 650 may simply be the channel estimates that are weighted to the BS precoding weights as signaled by quantization values fed forward by BS 110. The composite channel estimates 650 and the beamformed data 610 or beamformed payload transmission are used to detect the beamformed data 660 encapsulated in the transmission.

Figure 7:
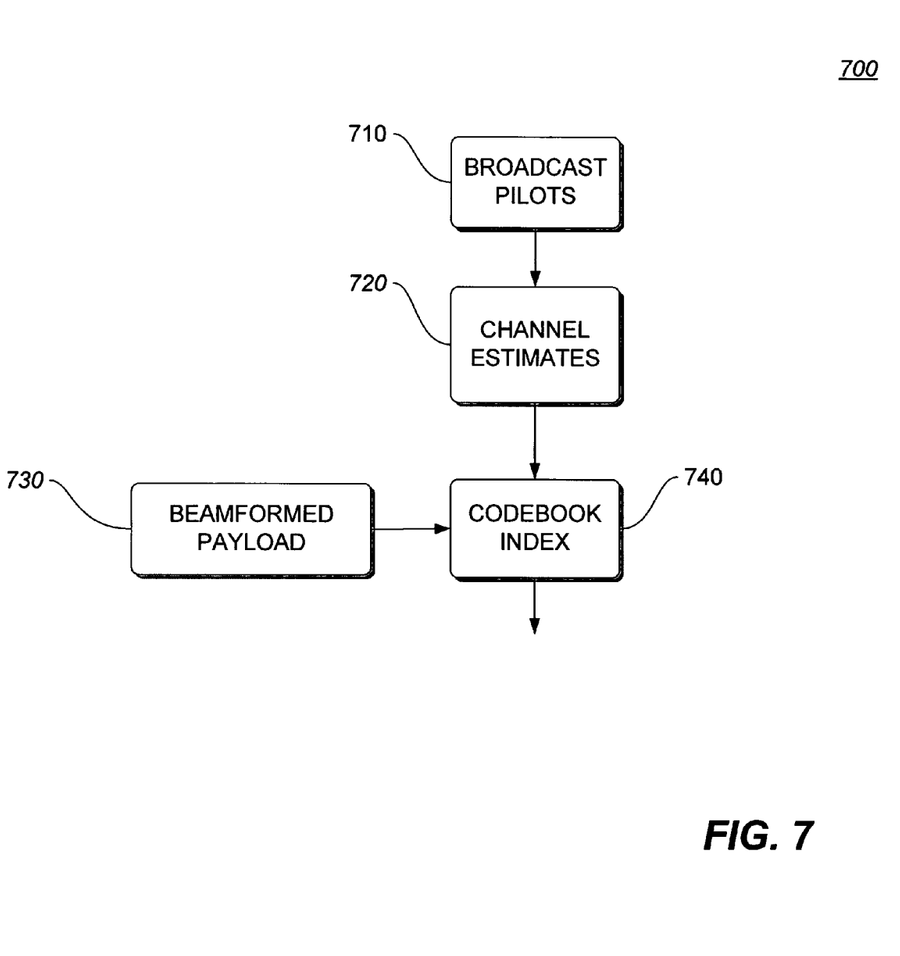
FIG. 7 is a flowchart showing blind detection of codebook index at the MS in accordance with a possible embodiment of the invention.

FIG. 7 is a flowchart of process 700 at the MS for determining codebook index in accordance with a possible embodiment of the invention. Process 700 begins at step 710 with the receipt of broadcast pilots from the BS. The broadcast pilots are used to determine the channel estimates to each of the transmit antennas. In step 720, the MS can run a multi-source channel estimator on the received broadcast pilot signals to determine channel estimates. The Beamformed payload 730 received from the BS is then used to determine the codebook index in step 740. This blind determination of the codebook index can be accomplished by comparing the beamformed payload 730 to the composite channel for each of the possible codebook indices. Alternatively the determination of the codebook index can be accomplished by comparing the decoded beamformed payload 730 for each composite channel for all possible codebook indices and choosing the codebook index as the one that properly decoded the data (e.g., by comparing cyclic redundancy codes or by choosing the one with the lowest MSE to the estimated symbols).

An alternative form of blind detection at the MS can be done with DOA beamforming. The BS uses ULCS, DCOVF, or normal uplink traffic to determine the DOA of the MS. The BS then uses this DOA to beamform the DL data (i.e., the beamformed payload 730) but does not feed forward the DOA to the MS. The MS can then use the broadcast pilots to determine its DOA (e.g., using an a technique known in the art such as MUSIC) and then the MS can use that DOA along with knowledge of how the BS computes it transmit weights to determine the composite channel which is then used to decode the beamformed payload 730. An alternative method for determining the DOAs is to quantize the DOAs to a small number of possible DOAs (e.g., 16 DOAs) and then the MS can blindly search using the corresponding transmit weights for each DOA in a similar manner to the blind codebook search described above.

Still another alternate embodiment, which is applicable to high speed operation when closed-loop operation may not work well, is for the MS and the BS to both use a fixed codebook known to both ends. In this case the MS does not sound the uplink, but the BS uses some indication of the MS speed (e.g., the MS feeds back a speed indication or the BS estimates the speed from other uplink traffic) to determine that high speed operation of the precoding should be done. The BS will then transmit the beamformed payload with this fixed codebook where the codebook can be a vector or matrix. The BS can indicate that high speed operation is occurring by indicating to the MS using a one bit flag in the downlink control or feedforward channel. Alternatively if the MS feeds back a speed indication, the MS can assume the BS is in this high speed operation if the speed is above some threshold. In any event, the MS would use the known codebook weight vector or matrix along with the channel estimates derived from the broadcast pilots to determine the composite channel which can then be used to decode the beamformed payload.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. It does not necessarily need to be one system used by all end users. Accordingly, the appended claims and their legal equivalents should only define the disclosure, rather than any specific examples given.

We claim:

1. A method for communicating data streams between a base station and a mobile station, the method comprising:
   receiving at the base station an uplink waveform transmitted by the mobile station;
   processing the received uplink waveform to determine communication parameters, wherein the communication parameters comprise codebook weights on groups of subcarriers; and
   transmitting a downlink signal to the mobile station from the base station in accordance with the determined communication parameters.

2. The method of claim 1, wherein the uplink waveform comprises a sounding waveform containing symbols known to the base station a-priori, symbols from a set known to the base station a-priori and analog or raw coefficients derived from channel estimates.

3. The method of claim 1 wherein processing the received uplink waveform further comprises computing parameters belonging to a set consisting of a direction of arrival, an array response vector, a set of eigenbeamforming weights, a set of array calibration coefficients.

4. The method of claim 1 wherein the downlink signal comprises broadcast pilots.

5. The method of claim 4 wherein the downlink signal comprises a beamformed payload.

6. The method of claim 4 wherein the downlink signal contains a feedforward channel with the communication parameters.

7. The method of claim 1 further comprising:
   estimating at the base station an uplink channel;

converting at the base station the estimated uplink channel to a downlink channel; and signaling through a feedforward channel the codebook weights to the mobile station.

8. A mobile station of a wireless communication system, comprising:

a transmitter for sending a sounding waveform to a base station;

a receiver for receiving from the base station codebook weights derived from the sounding waveform in a blind manner; wherein the receiver is configured to receive data communication from the base station; and a processor for detecting beamformed data from the received communication and received codebook weights from the base station.

9. The mobile station of claim 8, wherein the communication comprises broadcast pilots and beamformed payload transmission.

10. The mobile station of claim 9 wherein the processor further determines broadcast channel estimates from the broadcast pilots.

11. The mobile station of claim 10 wherein the processor further determines composite channel estimate from the codebook weights and the determined broadcast channel estimates.

12. The mobile station of claim 8 wherein the feedback channel provides at least one of uplink channel sounding or analog feedback.

13. A wireless communication system comprising:

a base station for communicating with a mobile station and for producing a codebook index from a sounding waveform received from the mobile station;

wherein the codebook index is produced at the base station by determining codebook weights on groups of subcarriers; and a mobile station for receiving the codebook index from the mobile station and for communicating with the base station;

wherein the codebook index facilitates communication between the base station and the mobile station.

14. The system of claim 13, wherein the communication from the base station includes broadcast pilots and beamformed payload transmission.

15. The system of claim 14, wherein the mobile station further determines broadcast channel estimates from the broadcast pilots.

16. The system of claim 15, wherein the mobile station detects beamformed data in the beamformed payload transmission using the determined composite channel estimate.

17. The system of claim 14, wherein the mobile station determines composite channel estimate from the codebook index and the determined broadcast channel estimates.

* * * * *